Oct. 17, 1939.  G. H. GASCOIGNE ET AL  2,176,527
CONTROLLED DELIVERY OF FLUIDS, PARTICULARLY MILK FROM CONTAINERS
Filed July 16, 1937  4 Sheets-Sheet 2
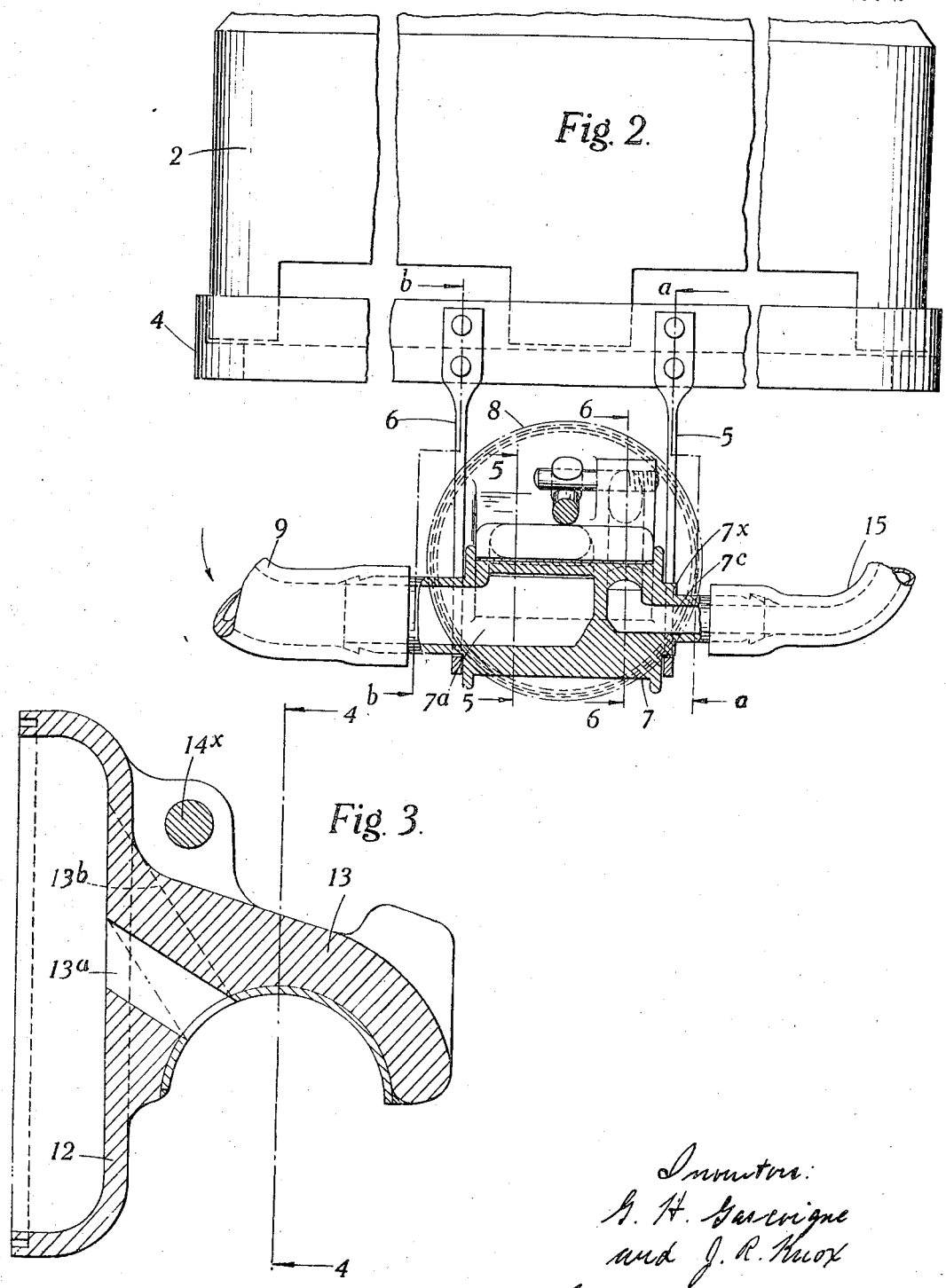

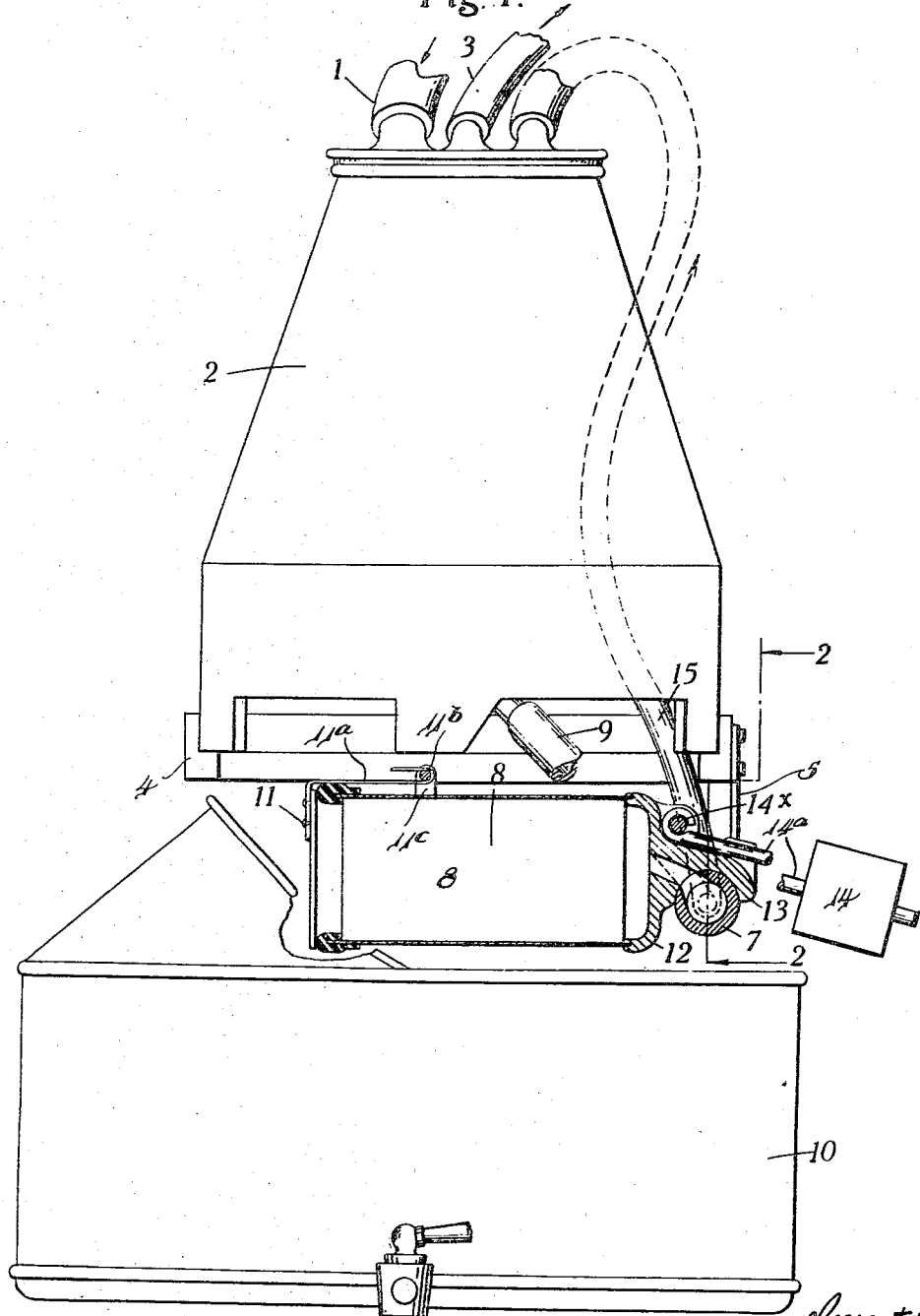

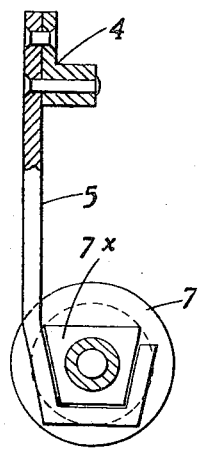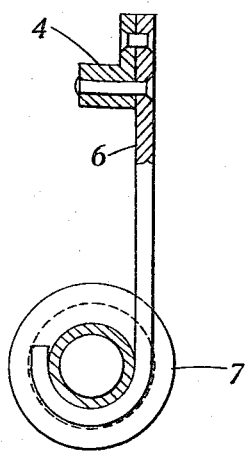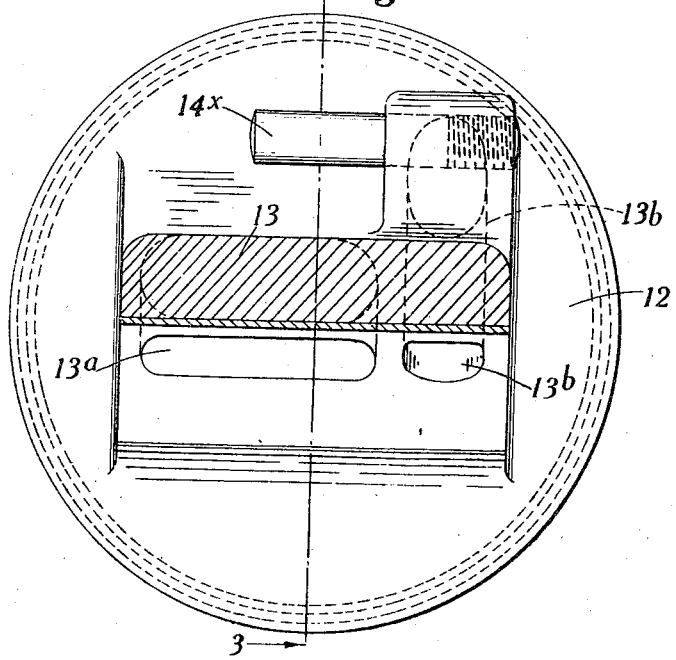

Oct. 17, 1939. G. H. GASCOIGNE ET AL 2,176,527
CONTROLLED DELIVERY OF FLUIDS, PARTICULARLY MILK FROM CONTAINERS
Filed July 16, 1937 4 Sheets-Sheet 4

UNITED STATES PATENT OFFICE

2,176,527

CONTROLLED DELIVERY OF FLUIDS, PARTICULARLY MILK FROM CONTAINERS

George Harry Gascoigne, Wokingham, and Joseph Rogers Knox, Reading, England

Application July 16, 1937, Serial No. 154,110
In Great Britain July 21, 1936

5 Claims.  (Cl. 31—82)

This invention relates to the controlled delivery of fluids from containers and has particular but not exclusive reference to the automatically controlled release of milk from the collecting chamber of automatic milking systems working on the intermittent suction principle.

For the release of milk from the collection chamber of milking systems of the kind referred to, it is known to provide a small supplementary chamber communicating on the one hand by a flap valve with the main collecting chamber, and on the other hand, by a second flap valve, with the atmosphere, the main chamber being under the constant vacuum of the system and the supplementary chamber being intermittently under vacuum and at atmospheric pressure by the operation of a pulsator. When the supplementary chamber is under vacuum milk flows into it from the main chamber past the intervening flap, and when the supplementary chamber is at atmospheric pressure the last mentioned flap is kept closed and milk flows out of the supplementary chamber past the second flap.

The chief object of the present invention is to provide an improved milk releasing mechanism and more particularly a mechanism which dispenses with the use of a pulsator and with the use of the inter-communicating flap valve between the chambers.

According to the present invention the intermittency of flow of the milk from the main collecting chamber to a supplementary chamber is automatically controlled by mounting the latter to rock or oscillate against gravity or a spring when charged with milk from the main chamber and thereby produce the desired intermittency of vacuum acting in said supplementary chamber.

Instead of the above mentioned intercommunicating flap valve between the chambers we use a hollow plug or the like which may also serve as the shaft or trunnion on or by which the supplementary chamber is rockably mounted below the main chamber.

The trunnion or shaft is not only hollowed out longitudinally but is ported laterally to co-operate with ports and passages in a bearing or sleeve. The trunnion or shaft can either be fixed to the supplementary chamber so as to rock therewith relatively to a stationary bearing, or the bearing or sleeve may be fixed to the supplementary chamber so as to rock therewith relatively to a stationary shaft. In both cases the rocking of the supplementary chamber changes the interconnection of the ports and passages to render the filling and emptying of said chamber automatic as hereinafter more fully described.

In order that the invention may be clearly understood and readily carried into effect we will now describe the same more fully with reference to the accompanying drawings in which:

Figure 1 is a front elevation of apparatus according to the invention for the controlled delivery of milk collected on the automatic milking system working under suction. It comprises generally a stationary main collecting chamber, an automatically rocking supplementary chamber, and a final collecting chamber.

Figure 2 is an enlarged view of the most important parts of the apparatus, as seen on the line 2—2 of Figure 1.

Figures 2ª and 2ᵇ are end views as seen on the lines a—a and b—b respectively in Figure 2 showing how the hollow ported supporting shaft is itself supported.

Figure 3 is a section on the line 4—4 of Figure 4 and

Figure 4 is a section on the line 3—3 of Figure 3, these two figures being enlarged views of the end of the supplementary chamber that embodies the sleeve.

Figure 5:
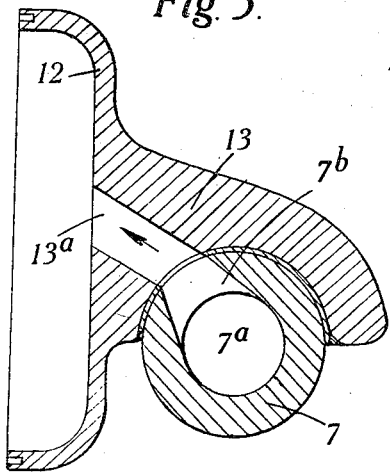

Figure 5 is a section on the line 5—5 of Figure 2 and

Figure 6:
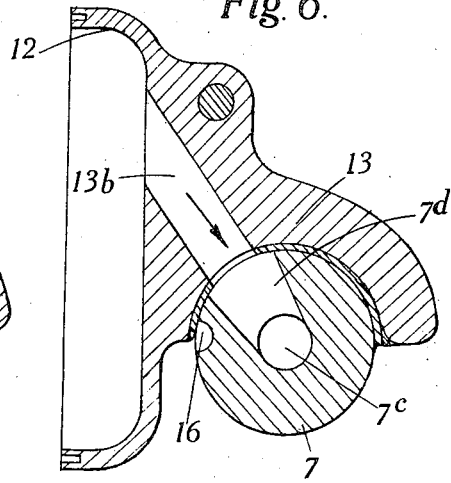

Figure 6 is a section on the line 6—6 of Figure 2.

Figure 7:
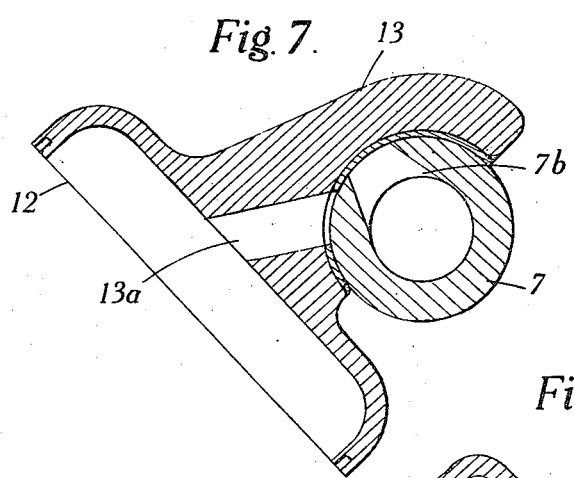
Figure 8:
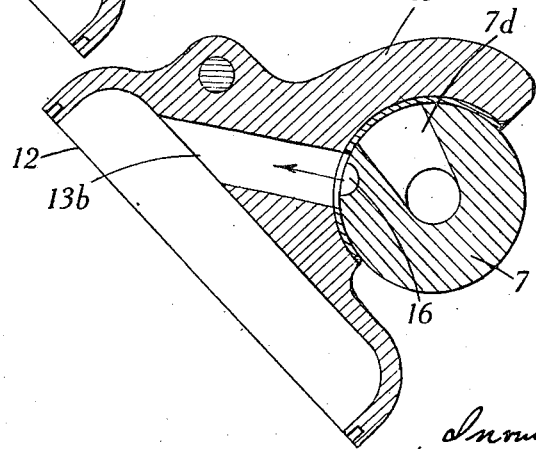

Figures 7 and 8 correspond respectively with Figures 5 and 6, but show the sleeve portion in its alternative position.

The milk from an automatic milking system passes through the pipe 1 into the main collecting chamber 2 in which reduced pressure is maintained constantly by suction applied to the pipe 3.

The main chamber 2 stands on a ring-shaped platform 4 from which is also suspended (by straps 5 and 6) a shaft 7 on which is balanced the supplementary chamber 8.

Milk passes from the main chamber 2 by way of a discharge pipe 9 into the supplementary chamber 8 and is automatically discharged therefrom intermittently (as hereinafter described) and collects in the final collecting chamber 10.

The chamber 8 has one end in the form of a flap 11, which is pivotally mounted through the medium of strap 11ª about pivot 11ᵇ supported by lugs 11ᶜ on the top of chamber 8, and which is kept closed when reduced pressure prevails inside the chamber but becomes loose and allows the milk therein to pour out when the reduced pressure is destroyed and atmospheric pressure is restored.

The other end 12 of the chamber 8 is formed with a sleeve portion 13 which bears upon and co-operates with the shaft 7.

The chamber 8 is counterbalanced by a weighted arm, comprising a weight 14 arranged on an arm 14ª mounted on a pin 14ˣ to such an extent that milk can collect in the chamber up to a certain amount whereupon the total weight exceeds the counterbalance and the chamber rocks from a horizontal position to a downwardly inclined position, whereupon it discharges the milk into the final collecting chamber 10. The empty chamber is thereupon restored by the counterweight to the horizontal position.

We will now describe the means by which the chamber 8 is intermittently fed with milk and intermittently put under reduced pressure.

The shaft 7 has a hollow axial portion 7ª connected to the main chamber discharge pipe 9, and a hollow axial portion 7ᶜ connected by a pipe 15 to the reduced pressure space above the milk in the main chamber 2.

In the sleeve portion 13 of the end 12 of the chamber 8 are formed two passages 13ª and 13ᵇ extending from the internal surface of the sleeve to the interior of the chamber at different levels therein.

The passage 13ª is in the same transverse plane as a lateral port 7ᵇ in the hollow axial portion 7ª of the shaft 7. Similarly the passage 13ᵇ is in the same transverse plane as a lateral port 7ᵈ in the hollow axial portion 7ᶜ of the shaft.

Along the side of the shaft 7 is formed a groove 16 leading from the open end thereof to the passage 13ᵇ.

The operation of the parts will be readily understood with reference to Figures 5 to 8.

While the chamber 8 is filling, milk from the main chamber 2 passes by way of the pipe 9 into the hollow portion 7ª of the shaft 7 and thence through the port 7ᵇ and along the passage 13ª into the chamber (Figure 5). Meanwhile the flap 11 of the chamber 8 is kept closed by the suction which is maintained in said chamber by way of passage 13ᵇ, port 7ᵈ, axial space 7ᶜ and the suction pipes 15 and 3. (Figure 6.)

When the chamber 8 overbalances (carrying the sleeve portion 13 with it) the passage 13ª is carried out of register with the milk port 7ᵇ and the latter is closed, thus stopping the milk flow from the main chamber 2. (Figure 7.) Simultaneously the connection of the chamber to the suction of pipe 15 is broken, and the groove 16 on the shaft 7 registers with the passage 13ᵇ so that air enters the interior of the chamber 8 and establishes atmospheric pressure therein (Figure 8), whereupon the flap 11 becomes free to open and allows the collected milk to discharge into the final chamber 10. When the chamber 8 becomes empty the counterbalancing arm 14 prevails and restores the chamber to the horizontal position ready to receive more milk.

Although the constructional details of the preferred embodiment of the invention have been hereinbefore described it is to be understood that the scope of the invention is not limited thereto and that the principle of operation can be achieved by different details. For example the shaft 7 might be in the form of a hollow plug rocking (like a trunnion) with the chamber 8 and being embraced by a stationary sleeve. Moreover the sleeve 13 might entirely embrace the shaft 7 instead of only partly surrounding it but the construction shown is preferred as it facilitates quick assembly and dis-assembly of the parts.

It is to be noted that the shaft 7 is supported near one end by the strap 5 engaging a polygon-shaped portion 7ˣ thereon whilst the other end is supported by the strap 6 merely curled around the round shaft. This arrangement ensures that the parts cannot be assembled wrongly.

What we claim is:

1. Apparatus for controlling the collection and discharge of liquids, comprising a main chamber connected on the one hand to a source of liquid and on the other hand to a source of constant suction, a rockable counterbalanced supplementary chamber having liquid flow communication with said main chamber and airflow communication with said source of constant suction, and a ported journal member upon which said supplementary chamber is rockably mounted, said journal member serving also as a valve to control the liquid flow communication between said supplementary chamber and said main chamber and the airflow communication between said supplementary chamber and said source of constant suction in accordance with the rocking movements of said supplementary chamber, whereby as the supplementary chamber overbalances due to filling under reduced pressure it automatically causes shut-off of the liquid and of the suction thereto and establishes atmospheric pressure therein and release of the collected liquid therefrom, whereupon the self-emptied chamber returns to its former position.

2. Apparatus according to claim 1, said relatively rockable supplementary chamber and journal member having co-operating ports and passages therein so constructed and arranged that the supplementary chamber is under the reduced pressure prevailing in the main chamber while the liquid from the latter flows thereinto, and that the supplementary chamber, when rocked by overbalancing, becomes internally equalized with the atmospheric pressure and the liquid therein is discharged, whereupon initial conditions are restored.

3. Apparatus according to claim 1, said journal member being a hollowed out and ported shaft, and said supplementary chamber being provided with a co-operating extending bearing sleeve, said sleeve being provided with passages cooperating with the ports of said journal member.

4. Apparatus according to claim 1, said journal member consisting of a supported hollow shaft, a sleeve-like portion at one end of the rockable chamber to rockably engage said shaft, a self-opening outlet at the other end of said chamber, counterbalancing means for said chamber, and means connecting the interior of said hollow shaft to the liquid in the main chamber, and to the source of reduced pressure, said shaft and sleeve-like portion having co-operating ports and passages for the purpose specified.

5. Apparatus for controlling the collection and discharge of liquids, comprising a main chamber connected on the one hand to a source of liquid and on the other hand to a source of constant suction, a rockable counterbalanced supplementary chamber having liquid flow communication with said main chamber and airflow communication with said source of constant suction, and means whereby as the supplementary chamber overbalances due to filling under reduced pressure it automatically causes shut-off of the liquid and of the suction thereto and establishes atmospheric pressure therein and release of the collected liquid therefrom, whereupon the self-emptied chamber returns to its former position, said means including a stationary hollowed out and ported shaft in communication with the liquid in said main chamber and with the source of reduced pressure, a cooperating sleeve rockable with the rockable chamber and having passages interconnecting the interior of said rockable chamber with the interior of said shaft, and means supporting said shaft at its ends non-interchangeably.

GEO. H. GASCOIGNE.
J. R. KNOX.